(12) United States Patent
Sun et al.

(10) Patent No.: US 10,742,915 B2
(45) Date of Patent: Aug. 11, 2020

(54) UNIQUE IDENTIFICATION VALUE FOR A SENSOR

(71) Applicant: Ambarella International LP, Santa Clara, CA (US)

(72) Inventors: Luyi Sun, Shanghai (CN); Zhi He, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/223,561

(22) Filed: Dec. 18, 2018

(65) Prior Publication Data

US 2019/0124282 A1 Apr. 25, 2019

Related U.S. Application Data

(63) Continuation of application No. 15/270,232, filed on Sep. 20, 2016, now Pat. No. 10,200,643.

(51) Int. Cl.
*H04N 5/367* (2011.01)
*H04N 5/365* (2011.01)
*H04N 5/217* (2011.01)
*G06K 9/03* (2006.01)
*G06K 9/36* (2006.01)
*H04N 9/07* (2006.01)

(52) U.S. Cl.
CPC ............ *H04N 5/367* (2013.01); *G06K 9/036* (2013.01); *G06K 9/36* (2013.01); *H04N 5/3651* (2013.01); *H04N 5/3675* (2013.01); *H04N 5/2178* (2013.01); *H04N 9/07* (2013.01)

(58) Field of Classification Search
CPC ........ H04N 5/357; H04N 5/365; H04N 5/367; H04N 5/3675; H04N 5/3651; H04N 5/2178; G06K 9/036; G06K 9/36
See application file for complete search history.

(56) References Cited

U.S. PATENT DOCUMENTS 6,320,934 B1 * 11/2001 Carroll ................... A61B 6/14
 348/E3.02
7,271,833 B2 * 9/2007 Kubota ................. H04N 5/367
 348/245

(Continued)

FOREIGN PATENT DOCUMENTS

CN 105300436 A 2/2016 ............. G01D 18/00
CN 105874469 A 8/2016 ............... G06K 9/00

*Primary Examiner* — Ngoc Yen T Vu
(74) *Attorney, Agent, or Firm* — Christopher P. Maiorana, PC

(57) ABSTRACT

An apparatus includes an interface and a processor. The interface may be configured to receive a plurality of sensed values from a sensor under a plurality of conditions. The processor may be connected to the interface and may be configured to (i) generate a plurality of patterns in response to the sensed values, where each of the patterns includes a plurality of positions of a plurality of bad values among the sensed values in a corresponding one of the conditions, (ii) identify a plurality of consistently bad values among the bad values in the patterns and (iii) indicate that the sensor has been replaced where the positions associated with the consistently bad values do not correlate to a plurality of known positions of the consistently bad values previously identified in the sensor.

18 Claims, 7 Drawing Sheets

(56) References Cited

U.S. PATENT DOCUMENTS

| | | | |
|---|---|---|---|
| 7,291,507 B2* | 11/2007 | Bidermann | H01L 23/544 257/48 |
| 7,427,759 B1* | 9/2008 | Pruvot | G06K 19/18 250/338.1 |
| 7,511,748 B2* | 3/2009 | Kagle | H04N 5/367 348/187 |
| 7,602,426 B2 | 10/2009 | Sato | 348/207.1 |
| 7,787,034 B2 | 8/2010 | Ying | 348/222.1 |
| 8,538,095 B2 | 9/2013 | Fedele | 382/124 |
| 8,736,714 B2 | 5/2014 | Ordoubadian | 348/231.2 |
| 8,953,848 B2 | 2/2015 | Ivanov | 382/115 |
| 9,124,831 B2 | 9/2015 | Mullis | |
| 9,224,030 B2 | 12/2015 | Du | |
| 9,445,021 B1 | 9/2016 | Linzer | |
| 9,584,800 B2* | 2/2017 | Beck | H04N 17/045 |
| 10,229,481 B2* | 3/2019 | Manbeck | G06T 5/005 |
| 2005/0253940 A1 | 11/2005 | Chiba | 348/247 |
| 2013/0229550 A1* | 9/2013 | Nakao | H04N 5/367 348/247 |
| 2015/0347607 A1 | 12/2015 | Gredegard | 707/758 |
| 2017/0070692 A1 | 3/2017 | Lin | |
| 2018/0082091 A1 | 3/2018 | Powell | |

* cited by examiner

UNIQUE IDENTIFICATION VALUE FOR A SENSOR

This application relates to U.S. Ser. No. 15/270,232, filed Sep. 20, 2016, which relates to Chinese Application No. 201610812850.0, filed Sep. 9, 2016, each of which is hereby incorporated by reference in their entirety.

FIELD OF THE INVENTION

The invention relates to video signal processing and security generally and, more particularly, to a method and/or apparatus for implementing a unique identification value for a sensor.

BACKGROUND

Detection of a change of a hardware-dependent identification value is a basis of anti-hardware cloning security operations. A unique hardware identification value is conventionally used as a basis for a digital signature, often used in secure transactions such as authentication. A level of security depends on a uniqueness of the hardware identification value.

Two conventional techniques for generating a hardware identification value involve derivation from a media access control address or use an external cryptography chip. The hardware identification values derived from configurable media access control addresses do not guarantee hardware uniqueness as multiple copies of the hardware can be configured with the same media access control address. External cryptography chips are more likely to generate unique hardware identification values at the expense of increased system complexity and cost.

It would be desirable to implement a unique identification value for a sensor

SUMMARY

The present invention concerns an apparatus having an interface and a processor. The interface may be configured to receive a plurality of sensed values from a sensor under a plurality of conditions. The processor may be connected to the interface and may be configured to (i) generate a plurality of patterns in response to the sensed values, where each of the patterns includes a plurality of positions of a plurality of bad values among the sensed values in a corresponding one of the conditions, (ii) identify a plurality of consistently bad values among the bad values in the patterns and (iii) indicate that the sensor has been replaced where the positions associated with the consistently bad values do not correlate to a plurality of known positions of the consistently bad values previously identified in the sensor.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
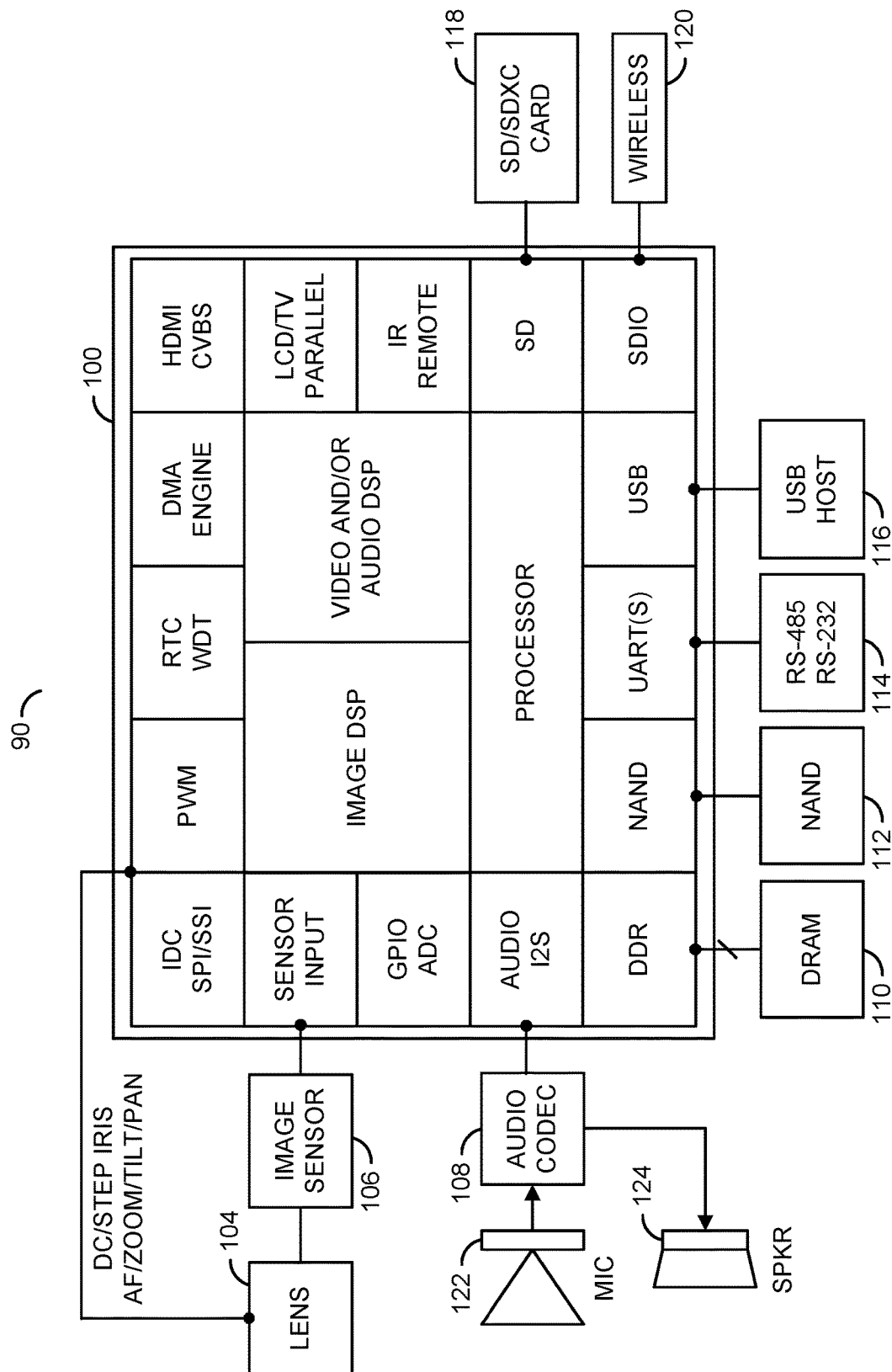
FIG. 1 is a block diagram of a camera system.

Embodiments of the present invention include providing a unique identification value for a sensor that may (i) detect a hardware change of a camera sensor in support of an anti-hardware-cloning capability, (ii) generate a digital signature based on sensor data, (iii) provide a high level of security for authentication, (iv) avoid an introduction of new hardware, (v) reduce a cost increase of the camera, (vi) avoid an increase in the hardware complexity of the camera and/or (vii) be implemented as one or more integrated circuits.

Various embodiments of the invention generally implement a technique to generate a physically unclonable unique hardware identification value from a physical unclonable function of an image sensor in a camera system. The physical unclonable function may be based on fabrication-dependent random characteristics (e.g., eigenvalues) of the sensor. The camera system generally includes at least the image sensor (e.g., a complementary metal-oxide-semiconductor (CMOS) sensor or a charge coupled device (CCD) sensor), one or more volatile memory circuits (e.g., dynamic random access memory), one or more nonvolatile memory circuits (e.g., flash memory) and at least one processing circuit. The image sensor is generally an electro-optical sensor having multiple sensing elements (or pixels). The sensing elements may be arranged in a two-dimensional array. Each sensing element may be configured to generate a sequence of pictures from light received at a surface of the image sensor. The sequence of pictures is generally stored in the volatile memory and processed by the processing circuit. The processing may utilize the random characteristics of the image sensor to calculate the unique identification value. The characteristics may be in the form of relatively stable bad pixel locations. The bad pixel locations may be identified by respective sensed values (or bad values) that have a significant bias away from expected values under multiple lighting conditions, multiple temperatures and/or multiple operating voltages. The bad pixels (or bad sensing elements) commonly exhibit improper performance in converting light into an electrical signal.

The relatively stable bad pixel locations are generally determined based on statistics gathered from the sequence of pictures generated by the sensor. A bad pixel location pattern may be derived by filtering the statistics to establish a worst and relatively stable bad pixel list (WSBPL). The bad pixel location pattern buffered in the bad pixel list may be processed by the processing circuit to calculate a unique hardware identification value for the sensor. The bad pixel location pattern and/or the unique hardware identification value may subsequently be stored in the nonvolatile memory. The stored bad pixel location pattern and/or the unique hardware identification value may be used at a later time to detect if the sensor has been physically replaced and/or electronically replaced. The stored bad pixel location pattern and the unique hardware identification value may also be used to determine if some memory circuitry has been replaced. Features of deriving a unique hardware identification value from a fabrication-dependent bad pixel pattern of the sensor may be beneficial in that the unique hardware identification value is virtually unclonable, provides a high level of security, does not introduce new hardware, reduces a cost increase to add the features to the camera, and avoids an increase in the hardware complexity of the camera when adding the features.

Referring to FIG. 1, a block diagram of a camera system 90 is shown illustrating an example implementation of a camera/recorder system (or apparatus). In some embodiments, the camera system 90 may be a digital video camera, a digital still camera or a hybrid digital video/still camera, collectively and individually referred to as digital cameras. In an example, the electronics of the camera system 90 may be implemented as one or more integrated circuits. For example, an application specific integrated circuit (ASIC) or system-on-a-chip (SOC) may be used to implement a processing portion of the camera system 90.

In various embodiments, the camera system 90 may comprise a camera chip (or circuit) 100, a lens assembly 104, an image sensor 106, an audio codec 108, dynamic random access memory (DRAM) 110, nonvolatile memory (e.g., NAND flash memory, NOR flash memory, etc.) 112, one or more serial interfaces 114, an interface 116 for connecting to or acting as a universal serial bus (USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 90 (e.g., via a video cable, a high definition media interface (HDMI) cable, a universal serial bus (USB) cable, an Ethernet cable, or wireless link).

The camera circuit 100 generally comprises a number of modules (or circuits) including, but not limited to, a pulse width modulation (PWM) module, a real time clock and watchdog timer (RTC/WDT), a direct memory access (DMA) engine, a high-definition multimedia interface (HDMI), an LCD/TV/Parallel interface, a general purpose input/output (GPIO) and an analog-to-digital converter (ADC) module, an infrared (IR) remote interface, a secure digital input output (SDIO) interface module, a secure digital (SD) card interface, an audio inter-IC sound (I2S) interface, an image sensor input interface, and a synchronous data communications interface (IDC SPI/SSI). The camera circuit 100 may also include an embedded processor (e.g., ARM, etc.), an image digital signal processor (DSP), and a video and/or audio DSP. In embodiments incorporating the lens assembly 104 and image sensor 106 in the system 90, the camera circuit 100 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20. The camera circuit 100 may also include support for communicating using one or more of the universal serial bus protocols (e.g., USB 1.0, 2.0, 3.0, etc.). The camera circuit 100 may also be configured to be powered via the USB connection. However, other communication and/or power interfaces may be implemented accordingly to meet the design criteria of a particular application.

In various embodiments, programming code (e.g., executable instructions for controlling various processors and encoders of the camera circuit 100) may be stored in one or more of the memories 110 and 112. When executed by the camera circuit 100, the programming code generally causes one or more processors in the camera circuit 100 to configure video synchronization operations and start video frame processing operations. The resulting compressed video signal may be presented to the SD/SDXC card 118, and/or the wireless interface 120, and/or the USB interface 116.

Figure 2:
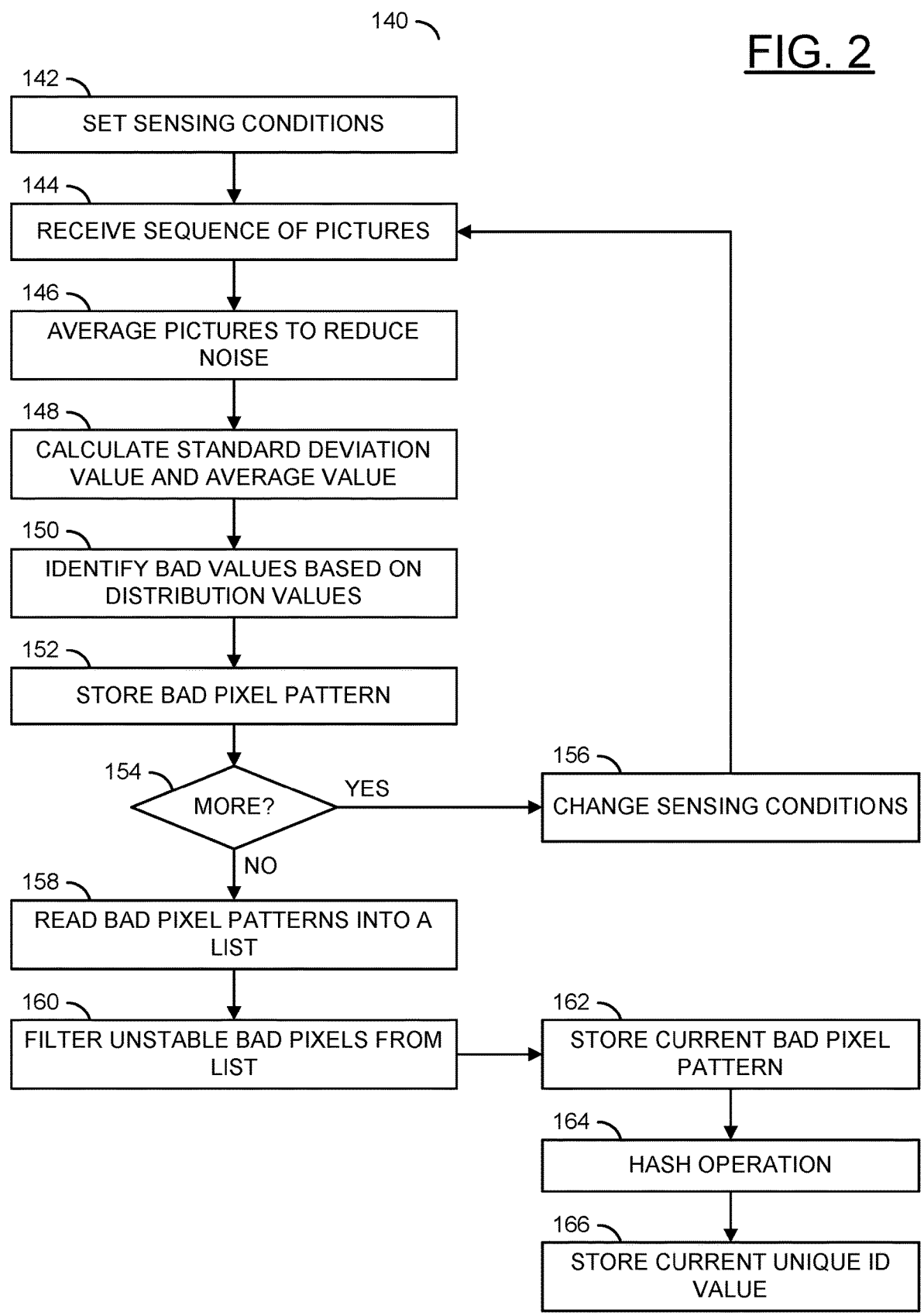
FIG. 2 is a flow diagram of a method for generating a unique identification value.

Referring to FIG. 2, a flow diagram of an example method 140 for generating a unique identification value is shown. The method (or process) 140 may be performed by the camera circuit 100. The method 140 generally comprises a step (or state) 142, a step (or state) 144, a step (or state) 146, a step (or state) 148, a step (or state) 150, a step (or state) 152, a decision step (or state) 154, a step (or state) 156, a step (or state) 158, a step (or state) 160, a step (or state) 162, a step (or state) 164, and a step (or state) 166.

Figure 3:
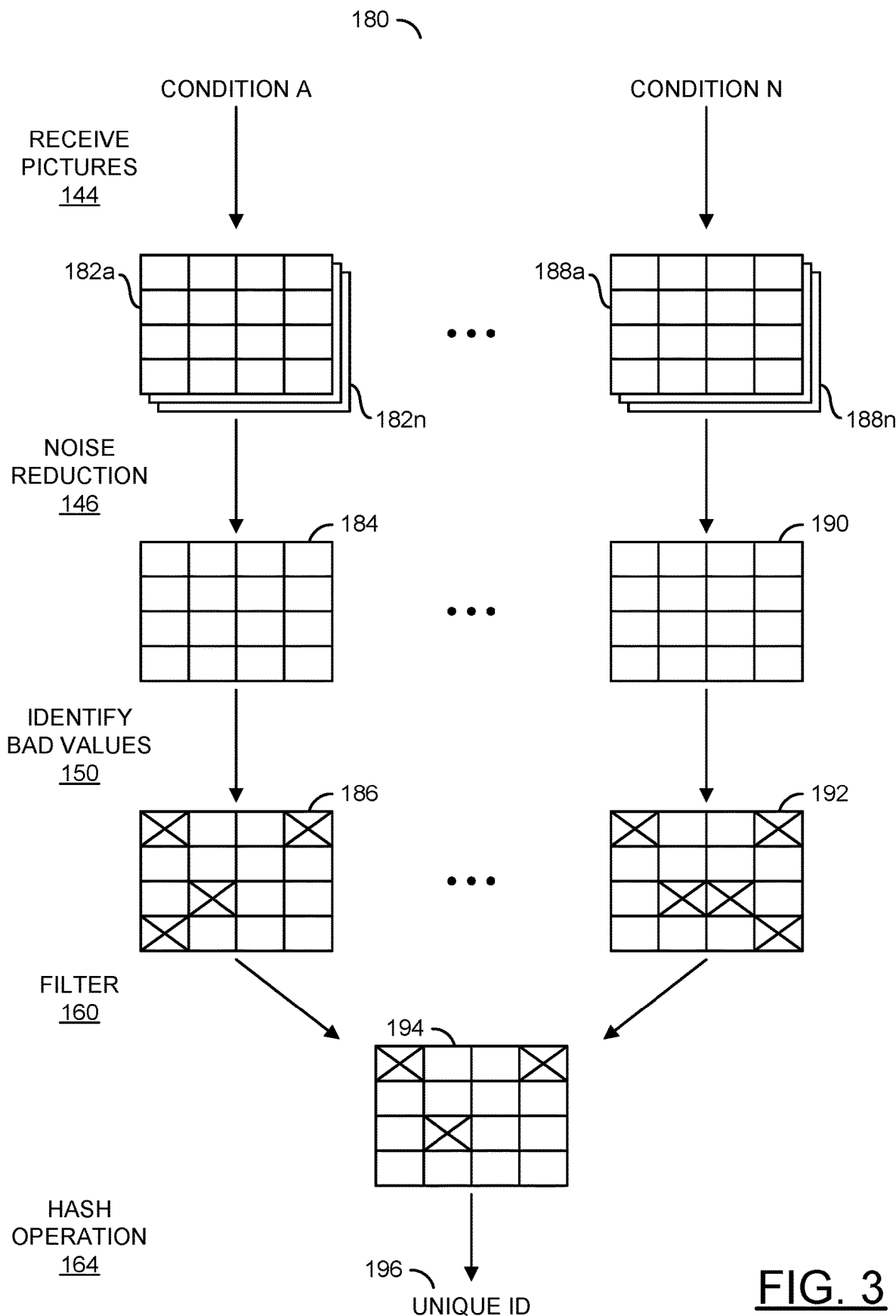
FIG. 3 is a diagram of sequences of pictures.

Referring to FIG. 3, a diagram of example sets of pictures 180 is shown. The picture sets are generally used to illustrate an example operational scenario of the camera circuit 100 in determining a unique hardware identification value of the sensor 106. Other scenarios may be implemented to meet the design criteria of a particular application.

Returning to FIG. 2, an initial set of conditions of the camera system 90 (e.g., CONDITION A in FIG. 3) may be set by default and/or manually entered settings in the step 142. The conditions may include, but are not limited to, a F-stop or aperture (or iris) value, a shutter speed, an analog gain, and/or a digital gain. The initial conditions generally influence a brightness of a sequence of pictures captured by the sensor 106.

The camera circuit 100 may receive the pictures from the sensor 106 in the step 144. Multiple pictures (e.g., pictures 182a-182n in FIG. 3) in the sequence of pictures may be averaged together by the camera circuit 100 in the step 146. For example, the averaging operation may generate an average picture (e.g., picture 184 in FIG. 3) from 8 to 16 individual pictures. The averaging operation generally reduces a noise in the average picture 184. In some situations, the averaging operation may be a temporal averaging applied on a pixel-by-pixel basis. In other situations, the averaging operation may be a combination of an intra-picture spatial averaging and an inter-picture temporal averaging.

After the noise has been reduced by the averaging operation, the camera circuit 100 may calculate multiple brightness (or amplitude) distribution values (e.g., a standard deviation value and an average value) in the step 148. In various embodiments, the amplitude distribution values may conform to a normal distribution (e.g., Gaussian distribution). The distribution values may be calculated on a pixel-by-pixel basis. For example, the camera circuit 100 may determine the average sensed value of each pixel and a standard deviation value for each pixel based on the sequence of co-located pixels in the sequence of pictures (e.g., a standard deviation based on the 8 co-located pixels in the sequence of 8 consecutive pictures.) In other embodiments (e.g., where the camera system 90 is pointed at a spatially uniform source of light or the aperture is closed, the distribution values may be calculated over multiple regions (e.g., macroblocks, slices, quadrants, etc.) or over all of the averaged picture.

If each sensed value from the pictures is independent and random, the sensed values may conform to a normal (or Gaussian) distribution. An average value AVG among a number n of sensed values i may be calculated by formula (1) as follows:

$$AVG = \frac{1}{n}\sum_{i=1}^{n} i \qquad (1)$$

A standard deviation σ of the pixel values is generally calculated by formula (2) as follows:

$$\sigma = \frac{1}{n} \sqrt[2]{\sum_{i=1}^{n} (i - AVG)^2} \qquad (2)$$

Most pixel values i may be in a range of AVG−3σ to AVG+3σ in amplitude. A probability of any given pixel value being within 3 standard deviations may be 99.7 percent. A probability of any given pixel value being within 4 standard deviations may be 99.997 percent.

In the step 150, the camera circuit 100 may identify the location of bad pixels by finding corresponding bad pixels values. The bad pixel values may be the sensed values that are multiple (e.g., 3, 4, or more) standard deviations away from expected average values. Pixel locations that create the bad pixel values may be referred to as bad pixel locations. As illustrated in the example shown in FIG. 3, the averaged picture may have bad pixel locations indicated by "X" and good pixel locations indicated by white. A pattern 186 of the bad pixel locations may be stored in a list within a memory (e.g., the memory 110, 112 or 118) in the step 152.

In some embodiments, the camera circuit 100 generally identifies bad pixel values as only too-bright bad pixels (e.g., only pixels values brighter than multiple standard deviations above the average values.) While seeking the bright bad pixels, the lens 104 may be covered by a light-proof lid, the aperture may be fully or nearly full closed and/or the shutter may be opened for a short time. In other embodiments, the camera circuit 100 may identify bad pixel values as only too-dark pixels (e.g., only pixel values darker than multiple standard deviations below the average values.) While seeking the dark bad pixels, the aperture may be fully or nearly fully opened and/or the shutter may remain open for a long time. In some embodiments, the bad pixel values may be identified as both the pixel values multiple standard deviations brighter than the average value and the pixel values multiple standard deviations darker than the average value. While seeking both bright bad pixels and dark bad pixels, the aperture and/or shutter may be operated in a normal manner to take typical pictures. One or more fixed thresholds may be used in some situations to identify too-bright pixel values and/or too-dark pixel values. In various embodiments, the thresholds may be compensated for temperature variations of the sensor 106. Other techniques for identifying the bad pixel values may be implemented to meet the design criteria of a particular application.

In the decision step 154, the camera circuit 100 may check to see if multiple (e.g., 8 to 16) bad pixel location patterns have been stored in the list. If more sensing conditions should be checked in search of more bad pixel location patterns, the camera circuit 100 may change the sensing conditions in the step 156. The method 140 may return to the step 144 to receive another sequence of pictures using the adjusted (new) sensing conditions. The method 140 generally loops around from the step 144 to the step 156 and back to the step 144 multiple (e.g., 2 to 10) times.

In a final loop (e.g., CONDITION N in FIG. 3), the received pictures may be received by the camera circuit 100 in the step 144. The individual pictures (e.g., pictures 188*a*-188*n* in FIG. 3) may be averaged together in the step 146 to form a final averaged picture (e.g., picture 190 in FIG. 3). The camera circuit 100 may calculate multiple distribution values of the final averaged picture 190 in the step 148. In the step 150, the camera circuit 100 may identify the final bad pixel locations (e.g., the bad pixel location pattern 192 in FIG. 3). The final bad pixel locations may be added to the list stored in the memory in the step 152.

Once the several bad pixel location patterns have been added to the list, the camera circuit 100 may read the entire list from the memory 110, 112 and/or 118 in the step 158. The bad pixel location patterns in the list may be filtered in the step 160 to remove unstable bad pixel locations from the list. Generally, pixel locations that qualify as bad in some, but not most or all of the bad pixel location patterns may be removed from the list by the filtering operation. Pixel locations that consistently generate bad values (or bad sensed pixel values) under the various sensing conditions (e.g., CONDITION A to CONDITION N in FIG. 3) may be retained. Pixel locations that do not consistently generate bad values may be eliminated. The filtered bad pixel location pattern (e.g., pattern 194 in FIG. 3) may be written by the camera circuit 100 into a memory (e.g., memory 112 or 118) in the step 162.

In the step 164, the camera circuit 100 may process the bad pixel location pattern (or the bad pixel list) to generate the unique identification value. The processing may be accomplished by performing a hash operation (or function) on the bad pixel locations of the bad pixel location pattern. In various embodiments, the hash operation may include, but is not limited to, the MD5 hash operation and the secure hash algorithms (SHA), including the SHA-1, the SHA-2, and the SHA-3 hash families, and the SHA-256 hash operation (in SHA-2 family). Other hash operations may be implemented to meet the design criteria of a particular application. The resulting unique identification value (e.g., value 196 in FIG. 3) may be written into a memory (e.g., 112 or 118) in the step 166.

Figure 4:
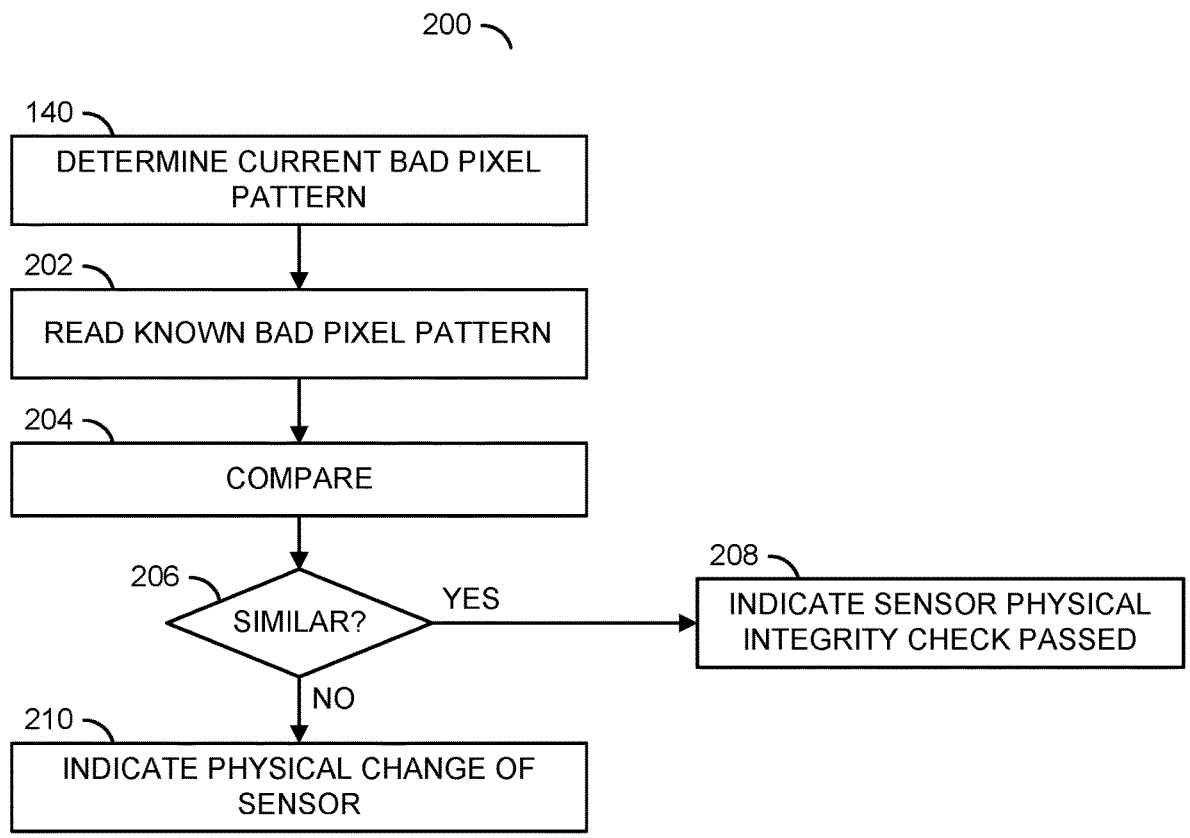
FIG. 4 is a flow diagram of a method for a sensor physical integrity check.

Referring to FIG. 4, a flow diagram of an example method 200 for a sensor physical integrity check is shown. The method (or process) 200 may be implemented by the camera circuit 100. The method 200 generally comprises the method 140, a step (or state) 202, a step (or state) 204, a decision step (or state) 206, a step (or state) 208, and a step (or state) 210.

The camera circuit 100 may initially determine a current bad pixel location pattern of the sensor 106 using the method 140. The current bad pixel location pattern may be stored in a current worst and relatively stable bad pixel list. In the step 202, the previously known bad pixel location pattern determined and stored earlier in time by the camera circuit 100 may be read from the memory. The known bad pixel location pattern may be stored in a known worst and relatively stable bad pixel list.

The current bad pixel location pattern may be compared with the known bad pixel location pattern in the step 204. If the current bad pixel location pattern and the known bad pixel location pattern are similar, the camera circuit 100 may conclude that data from the sensor 106 used to determined the current bad pixel location pattern is the same sensor 106 used to determine the known bad pixel location pattern at an earlier time (e.g., during a manufacture test and/or calibration). The camera circuit 100 may subsequently indicate in the step 208 that the sensor physical integrity check has passed. If the current bad pixel location pattern and the known bad pixel location pattern are not similar, the camera circuit 100 may conclude that the sensor 106 used to generate the current bad pixel location pattern is different from the sensor 106 used to generate the known bad pixel location pattern. The camera circuit 100 may indicate a physical and/or electrical change in the sensor 106 in the step 210.

A problem generally exists that even if the sensor 106 is physically and electrically unchanged, the current bad pixel location pattern sensed from the pixel values may change over time. The current bad pixel location pattern may vary with different internal and/or external factors such as, but not limited to, environment temperature, chip aging, and random circuit hot noise. Although the sensor 106 remains the same, each time that the current bad pixel location pattern is generated, if the corresponding unique hardware identification value is generated directly from the bad pixel location patterns, the results may not be the same. Considering the factors, each current bad pixel location pattern of a sensor 106 may change according to different external factors, but the change is generally limited.

To solve the problem of the time-varying current bad pixel location pattern, the camera circuit 100 generally employs the filter operation (e.g., step 160 in FIG. 2) to establish the worst and relatively stable bad pixel list and associated information. The bad pixels in the list may have brightness values that are significant biased away from the expected average (or mean or median) brightness values, and keep relatively stable. The bad pixel location patterns of different individual sensors 106 may differ, but the differences are generally limited. An arbitration having a threshold of similarity may be used in the comparison step 204 to account for the time-varying bad pixel location patterns. Various embodiments of the invention may define the similarity as a percentage of bad pixel locations with the same physical position and/or electrical position in the sensor 106. In some embodiments, the threshold of similarity may be approximately 50 percent. A value of the threshold of similarity may be used to determine if the two bad pixel lists being compared have a similarity less than the threshold or have a similarity larger than the threshold.

To determined probability estimations for similarities relative to the threshold, consider a case where the sensor 106 has total n pixels total and m bad pixels, and each pixel is independent of all other pixels. A probability P that two physically different sensors 106 have more than m/2 common bad pixels may be calculated by formula (3) as follows:

$$P = \left(\left(\left(\prod_{i=m/2+1}^{m} i\right) / \left(\prod_{i=1}^{m/2} i\right)\right) \times \left(\left(\prod_{i=n-m+1}^{n-m/2} i\right) / \left(\prod_{i=1}^{m/2} i\right)\right)\right) / \left(\left(\prod_{i=n-m+1}^{n} i\right) / \left(\prod_{i=1}^{m} i\right)\right)$$
$$= \left(\left(\prod_{i=m/2+1}^{m} i\right) \times \left(\prod_{i=m/2+1}^{m} i\right)\right) / \left(\left(\prod_{i=n-m/2+1}^{n} i\right) \times \left(\prod_{i=1}^{m/2} i\right)\right) \quad (3)$$

Consider an example case where a resolution of each sensor being compared is 1920×1080 pixels, the value n=1920×1080=2,073,600 total pixels, and assume m=40 bad pixel locations. Per formula (3), a probability that two different sensors have more than 50 percent common bad pixel positions (20 common out of 40 bad pixel positions are the same) is around 4.48×10$^{-86}$ percent. In actual cases by experimentation, CMOS-type sensors may have larger resolutions than 1920×1080 pixels, and may have more than 40 bad pixel locations. The resulting probability of finding 50 percent common bad pixel locations is commonly smaller that in the example case.

For two different bad pixel location patterns from the same sensor, assume that each bad pixel has a probability p of acting like a normal pixel and a probability of 1-p of acting like a bad pixel. According to binomial distribution, if a system has n elements, each element is independent, each element has a probability p to state a, and each element has a probability of 1-p to another state b, the system conforms to binomial distribution. A probability X of m elements being in the state a and n-m elements in the state b may be calculated by formula (4) as follows:

$$X = \left(\frac{n!}{m!(n-m)!}\right) \times p^m \times (1-p)^{n-m} \quad (4)$$

A probability Y of more than m/2 bad pixels acting like normal pixels may be calculated by formula (5) as follows:

$$Y = \sum_{i=m/2+1}^{m} \left(\left(\frac{m!}{(m-i)!(i!)}\right) \times p^i \times (1-p)^{m-i}\right) \quad (5)$$

Consider an example case where m=40 and p=5 percent (0.05). A probability that half the bad pixels would act like normal pixels may be less than approximately 2.7×10$^{17}$ percent. In actual cases, some bad pixels in the worst and relatively stable bad pixel list may behave consistently as bad pixels. Therefore, the probability p of bad pixels acting like normal pixels is less than 5 percent, so the probability that half the bad pixels would act like normal pixels may less than in the example case. Stated another way, the probability that two worst and relatively stable bad pixel lists from the same sensor 106 are the same may be close to 100 percent.

Figure 5:
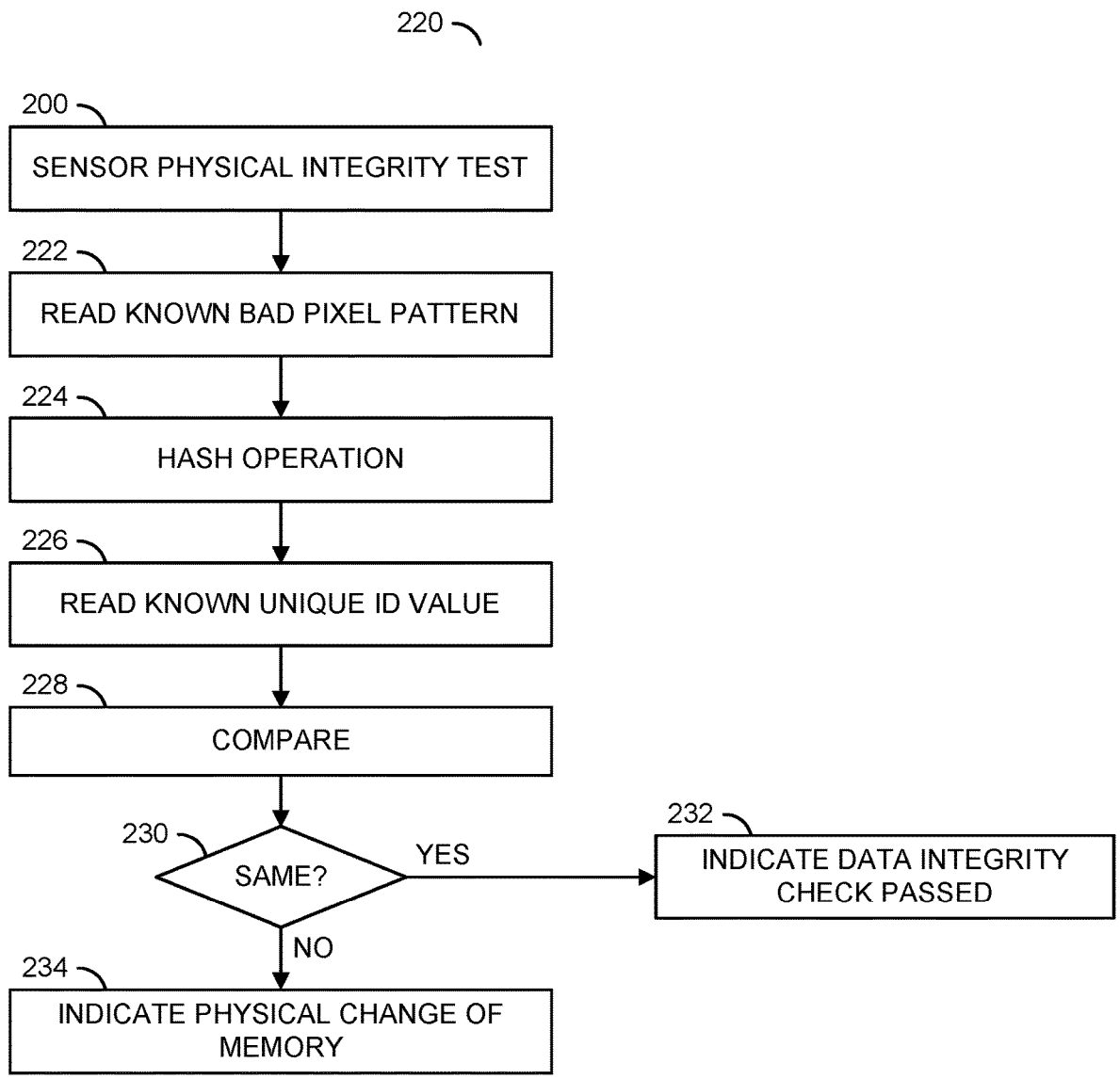
FIG. 5 is a flow diagram of a method for a data integrity check.

Referring to FIG. 5, a flow diagram of an example method 220 for a data integrity check is shown. The method (or process) 220 may be implemented in the camera circuit 100. The method 220 generally comprises the method 200, a step (or state) 222, a step (or state) 224, a step (or state) 226, a step (or state) 228, a decision step (or state) 230, a step (or state) 232, and a step (or state) 234. The method 220 may be useful where the bad pixel list and the unique hardware identification value are stored in different memories (e.g., memories 112 and 118).

The camera circuit 100 may initially perform the sensor physical integrity test 200 to determine if the sensor 106 is the same. If the sensor 106 is unchanged, the camera circuit 100 may read the previously known bad pixel location pattern from the memory (e.g., memory 112 or 118) in the step 222. The hash operation is generally performed on the previously known bad pixel location pattern to calculate a current unique hardware identification value in the step 224. In the step 226, the previously known unique hardware identification value may be read from the other memory (e.g., memory 118 or 112).

A comparison of the two unique hardware identification values may be performed in the step 228 by the camera circuit 100. If the two identification values are the same per the decision step 230, the camera circuit 100 may indicate in the step 232 that the data integrity check has passed in the step 232. If the two identification values are different, the camera circuit 100 may indicate in the step 234 that at least one of the memories 112 and/or 118 has been physically and/or electrically changed.

By way of example, the known worst and relatively stable bad pixel list may be stored in the nonvolatile memory 112 of the camera system 90 and the known unique hardware identification value may be stored in the removable nonvolatile memory card 118. Pictures and/or video captured by the camera system 90 may be subsequently stored in the memory card 118. When the memory card 118 is removed from the camera system 90, the memory card 118 contains both the pictures/video and the unique hardware identification value that indicates a source of the pictures/video.

If the memory card 118 is returned to the camera system 90, the camera system 90 regains an original hardware configuration and the data integrity check may conclude that the memories 112 and 118 are unchanged. If a different memory card 118 is installed in the camera system 90, the data integrity check may conclude that the memory card 118 is different. Afterwards, the camera circuit 100 may recalculate the unique hardware identification value from the worst and relatively stable bad pixel list in the memory 112 and store the recalculated unique hardware identification value in the new memory card 118.

Figure 6:
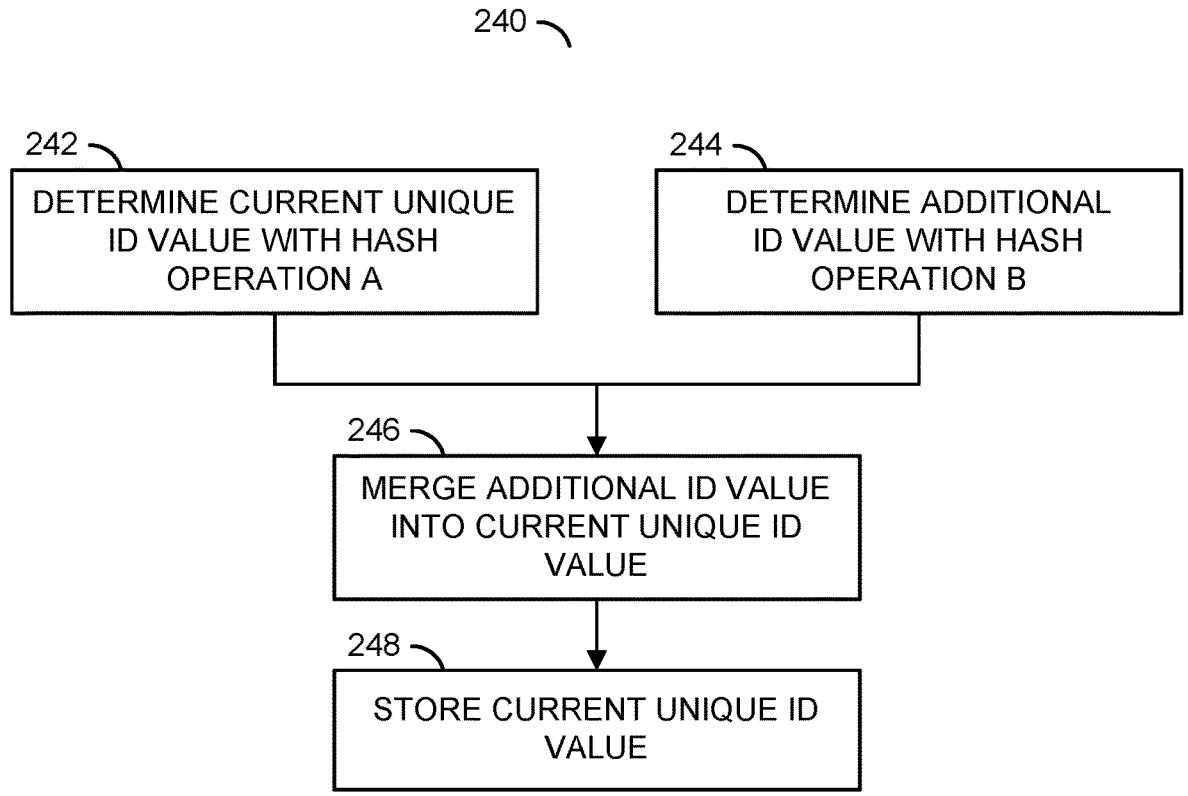
FIG. 6 is a flow diagram of a method for generating a complex unique hardware identification value.

Referring to FIG. 6, a flow diagram of an example method 240 for generating a complex unique hardware identification value is shown. The method (or process) 240 may be implemented by the camera circuit 100. The method 240 generally comprises a step (or state) 242, a step (or state) 244, a step (or state) 246, and a step (or state) 248.

In the step 242, the camera circuit 100 may determine a current unique hardware identification value for the sensor 106. The determination in the step 242 may use the method 140 (FIG. 2) with a hash operation A in the step 164. Sequentially or in parallel to the step 242, the camera circuit 100 may determine an additional unique hardware identification value for the sensor 106 in the step 244. The determination in the step 244 may use the method 140 (FIG. 2) with a different hash operation B in the step 164. The two unique hardware identification values may be merged with each other in the step 246 to produce the complex (a new current) unique hardware identification value. Utilizing two different hash functions and subsequently merging the results generally lowers a probability of identification value conflicts. The merged unique hardware identification value may be stored in the memory in the step 248.

The merge operation in the step 246 may implement one or more of several mathematical and/or logical operations. For example, a 64-byte block of data may be processed by the secure hash functions SHA-256 and MD5 to generate 32 data bytes and a 16-byte hash digest for a total of 48 bytes. Appending the two hash results together may create a 48-byte value that generally provides about $2^{48}$=2.8×$10^{14}$ possible values. Appending the 48-byte hash value with another 16 bytes of customized data generally produces a 64-byte unique identification value that provides $2^{64}$=1.8× $10^{19}$ possible values. In another example, the hash results of the step 242 may be logically XOR'd, added, subtracted, or multiplied with the hash results of the step 244 per the step 246. Other types of combination operations of the two hash values may be implemented to meet the design criteria of a particular application.

Figure 7:
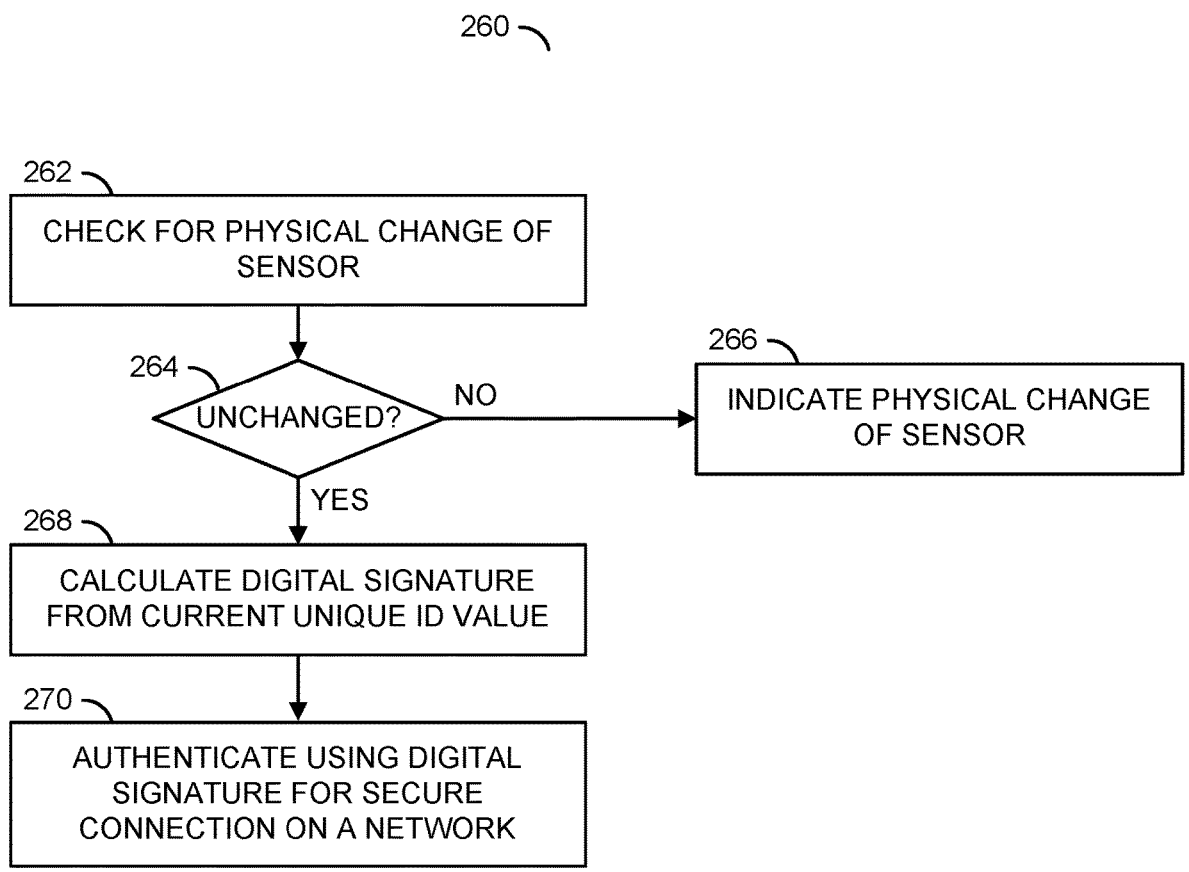
FIG. 7 is a flow diagram of a method for generating a digital signature.

Referring to FIG. 7, a flow diagram of an example method 260 for generating a digital signature is shown. The method (or process) 260 may be implemented by the camera circuit 100. The method 260 generally comprises a step (or state) 262, a decision step (or state) 264, a step (or state) 266, a step (or state) 268, and a step (or state) 270.

The camera circuit 100 may check for a change of the sensor 106 in the step 262. In some embodiments, the step 262 may include the sensor physical integrity check method 200. In the decision step 264, the camera circuit 100 may determine if the sensor 106 remains unchanged. If the camera circuit 100 determines that the sensor 106 has changed, the camera circuit 100 may indicate a physical and/or electrical change of the sensor 106 in the step 266 without generating a digital signature for the sensor 106. If the camera circuit 100 determines that the sensor 106 is unchanged, the camera circuit 100 may calculate a digital signature value from the unique hardware identification value and a private digital key in the step 268. In the step 270, the camera circuit 100 may use the digital signature value for authentication on a secure connection on a network (e.g., the wireless network).

The digital signature value may provide the camera system 90 with a secure identifier over a network, such as the Internet. Generally, only a private key owner (e.g., the camera circuit 100) may generate a corresponding digital signature, and only the sensor 106 may pass the sensor physical integrity check. Anyone with a public key may verify the digital signature relative to the unique hardware identification value. The authentication generally guarantees the derived communication channel has a high security level that may, for example, avoid potential man-in-the-middle attacks.

The functions and structures illustrated in the diagrams of FIGS. 1 to 7 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive a plurality of sensed values from a sensor under a plurality of conditions; and
   a processor connected to said interface and configured to (i) generate a plurality of patterns in response to said sensed values, wherein each of said patterns includes a plurality of positions of a plurality of bad values among said sensed values in a corresponding one of said conditions, (ii) identify a plurality of consistently bad values among said bad values in said patterns, (iii) compare current positions associated with said consistently bad values to a plurality of previously determined positions of said consistently bad values previously identified in said sensor, and (iv) when said current positions match said previously determined positions, provide authentication for a secure connection on a network using a digital signature calculated based on said plurality of consistently bad values.

2. The apparatus according to claim 1, wherein (i) said sensor comprises an electro-optical sensor and (ii) each of said sensed values is generated by a respective pixel.

3. The apparatus according to claim 1, wherein said processor is further configured to calculate a unique identification value of said sensor based on said positions associated with said consistently bad values and to calculate said digital signature from the unique identification value.

4. The apparatus according to claim 3, wherein said unique identification value is calculated by performing a hash operation on said positions associated with said consistently bad values.

5. The apparatus according to claim 4, wherein said processor is further configured to (i) generate an additional identification value by performing a different hash operation on said positions associated with said consistently bad values and (ii) merge said additional identification value into said unique identification value.

6. The apparatus according to claim 1, wherein (i) said processor is further configured to calculate a plurality of distribution values based on said sensed values, (ii) said distribution values characterize an amplitude distribution of said sensed values and (iii) said patterns are generated based on said distribution values.

7. The apparatus according to claim 6, wherein (i) said distribution values comprise a standard deviation value of said sensed values and an average value of said sensed values and (ii) said bad values are greater than a multiple of said standard deviation value away from said average value.

8. The apparatus according to claim 1, wherein said processor is further configured to identify said consistently bad values as said bad values that appear in most or all of said patterns.

9. The apparatus according to claim 1, wherein said interface, said processor and said sensor are part of a digital camera.

10. A method of using a sensor for authenticating a secure connection, comprising the steps of:
    receiving a plurality of sensed values from said sensor under a plurality of conditions;
    generating a plurality of patterns based on said sensed values using a processor, wherein each of said patterns includes a plurality of positions of a plurality of bad values among said sensed values in a corresponding one of said conditions;
    identifying a plurality of consistently bad values among said bad values in said patterns;
    comparing current positions associated with said consistently bad values to a plurality of previously determined positions of said consistently bad values previously identified in said sensor; and
    when said current positions match said previously determined positions, providing authentication for a secure connection on a network using a digital signature calculated based on said plurality of consistently bad values.

11. The method according to claim 10, wherein (i) said sensor comprises an electro-optical sensor and (ii) each of said sensed values is generated by a respective pixel.

12. The method according to claim 10, further comprising the steps of:
    calculating a unique identification value of said sensor based on said positions associated with said consistently bad values; and
    calculating said digital signature from the unique identification value.

13. The method according to claim 12, wherein said unique identification value is calculated by performing a hash operation on said positions associated with said consistently bad values.

14. The method according to claim 13, further comprising the steps of:
    generating an additional identification value by performing a different hash operation on said positions associated with said consistently bad values; and
    merging said additional identification value into said unique identification value.

15. The method according to claim 10, further comprising the step of:
    calculating a plurality of distribution values based on said sensed values, wherein (i) said distribution values characterize an amplitude distribution of said sensed values and (ii) said patterns are generated based on said distribution values.

16. The method according to claim 15, wherein (i) said distribution values comprise a standard deviation value of said sensed values and an average value of said sensed values and (ii) said bad values are greater than a multiple of said standard deviation value away from said average value.

17. The method according to claim 10, further comprising the step of:
    identifying said consistently bad values as said bad values that appear in most or all of said patterns.

18. The method according to claim 10, wherein the steps are performed in a digital camera.

* * * * *